(12) United States Patent
Casebeer et al.

(10) Patent No.: US 10,093,489 B2
(45) Date of Patent: Oct. 9, 2018

(54) VENEER TRANSPORTING APPARATUS

(71) Applicant: Sweed Machinery, Inc., Gold Hill, OR (US)

(72) Inventors: Tyler W. Casebeer, White City, OR (US); Chris J. Salyer, Central Point, OR (US); Burnell Wimer, Boise, ID (US)

(73) Assignee: SWEED MACHINERY, INC., Gold Hill, OR (US)

( * ) Notice: Subject to any disclaimer, the term of this patent is extended or adjusted under 35 U.S.C. 154(b) by 0 days.

(21) Appl. No.: 15/404,392

(22) Filed: Jan. 12, 2017

(65) Prior Publication Data

US 2018/0194570 A1 Jul. 12, 2018

(51) Int. Cl.
*B65G 47/31* (2006.01)
*B65G 43/08* (2006.01)
*F26B 25/00* (2006.01)
*B65G 37/00* (2006.01)

(52) U.S. Cl.
CPC ............. *B65G 43/08* (2013.01); *B65G 37/00* (2013.01); *F26B 25/004* (2013.01); *B65G 2203/0233* (2013.01); *B65G 2203/0291* (2013.01); *B65G 2811/0631* (2013.01); *F26B 2210/14* (2013.01)

(58) Field of Classification Search
CPC ................... B65G 15/24; B65G 47/31

USPC .................. 198/572, 577, 602, 644; 414/502
See application file for complete search history.

(56) References Cited

U.S. PATENT DOCUMENTS

| | | | | |
|---|---|---|---|---|
| 3,080,958 A | * | 3/1963 | Ensley | B65G 47/647 198/435 |
| 3,565,236 A | * | 2/1971 | Southworth | B27D 1/10 198/460.1 |
| 3,603,446 A | * | 9/1971 | Maxey | B65G 47/244 198/401 |
| 6,811,018 B2 | * | 11/2004 | Cotter | B65G 15/22 198/460.1 |
| 9,022,203 B2 | * | 5/2015 | LaPierre | B65G 47/31 198/382 |
| 2006/0272930 A1 | * | 12/2006 | Cotter | B65G 15/22 198/835 |
| 2014/0311864 A1 | * | 10/2014 | Ullmer | B65G 47/52 198/576 |
| 2015/0239591 A1 | * | 8/2015 | Bialy | B65G 37/00 53/517 |

* cited by examiner

*Primary Examiner* — Joseph A Dillon, Jr.
(74) *Attorney, Agent, or Firm* — Renner, Otto, Boisselle & Sklar, LLP

(57) ABSTRACT

An infeed rollcase for transporting an infeed object. The rollcase uses a split drive system to move infeed objects at varying speeds in different infeed decks of the infeed rollcase. By detecting the position of each infeed object along a front portion of each infeed deck, the drive speed of the split drive system is varied such that the infeed objects maintain a predetermined position (e.g., overlapping) with respect to a preceding infeed object.

22 Claims, 5 Drawing Sheets

VENEER TRANSPORTING APPARATUS

TECHNICAL FIELD

The present invention relates generally to a veneer transporting apparatus, and more particularly to a split drive infeed rollcase for transporting veneer.

BACKGROUND

A veneer is a thin layer of material, typically wood, but also potentially metal, polymer or ceramic. A layer of veneer may be used as a protective or ornamental facing, such as on the outside surface of a sheet of particle board. Or multiple layers of veneer may be bonded together, as in the formation of plywood.

An infeed rollcase is commonly used to transport wet veneer from a veneer feeder into a dryer, where the moisture is removed from the veneer.

SUMMARY

During transport of veneer sheets into the dryer, there can be delays during transport of the veneer from the veneer feeder into the infeed rollcase. To maximize space within the dryer and to prevent the ends of veneer from over drying, veneer sheets are typically overlapped slightly when stacked in the dryer. The delays during feeding of the veneer from the veneer feeder into the infeed rollcase creates difficulties when attempting to load veneer into the dryer. That is, if there is a problem feeding the veneer, the drier must either be stopped (so that there is no gap between veneer sheets) or a gap is created between adjacent veneer sheets. Both of these solutions result in reduced drier throughput.

Provided is an infeed rollcase using a split drive system that allows the transport of infeed objects to be sped up or slowed down in order to catch up with a preceding infeed object.

According to one aspect, there is provided an infeed rollcase including a plurality of infeed decks configured to transport a plurality of infeed objects. Each infeed object follows a corresponding preceding infeed object. Each infeed object includes a leading edge and a trailing edge. Each infeed deck includes a front portion having an infeed end and an outfeed end and including a front transporter and a back portion having an infeed end and an outfeed end and including a back transporter. A corresponding infeed object transported by the infeed deck passes from the infeed end of the front portion, to the outfeed end of the front portion, to the infeed end of the back portion, and to the outfeed end of the back portion. Each infeed deck also includes a split drive system. The split drive system includes a plurality of front motors, at least one back motor, and circuitry. Each front motor drives a corresponding front transporter of a corresponding one of the plurality of infeed decks. The at least one back motor drives the back transporter of each of the plurality of infeed decks. The circuitry is configured to determine the position of a leading edge of the infeed objects being transported along the front transporter of each of the plurality of infeed decks. For each of the plurality of front motors, the circuitry is configured to control a drive speed of the front motor based on the determined position of the leading edge of the infeed object along the corresponding front transporter, such that the infeed object being transported by each infeed deck reaches the back portion at the same time or such that the infeed object being transported by each infeed deck overlaps with the corresponding preceding infeed object being transported along a same infeed deck.

Alternatively or additionally, each infeed deck further includes an actuator located between the infeed end of the front portion and the outfeed end of the back portion. The actuator is configured to raise or lower, above or below a plane of the infeed deck, a portion of the infeed object or the corresponding preceding infeed object being transported by the infeed deck.

Alternatively or additionally, the actuator is located between the outfeed end of the front portion and the infeed portion of the back portion.

Alternatively or additionally, the circuitry is further configured to cause the actuator to raise or lower at least one of the leading edge of the infeed object or the trailing edge of the corresponding preceding infeed object.

Alternatively or additionally, for each of the plurality of front motors, the circuitry is further configured to control the actuator and the drive speed of the front motor, such that the leading edge of the infeed object located on the front portion passes under or over with the trailing edge of the corresponding preceding infeed object located on the back portion.

Alternatively or additionally, for each infeed deck, the circuitry is configured to cause the actuator of the infeed deck to raise the trailing edge of the corresponding preceding infeed object being transported along the infeed deck and control the drive speed of the first motor such that the leading edge of the infeed object is located beneath the trailing edge of the corresponding preceding infeed object. The circuitry is also configured to cause the actuator of the infeed deck to lower the trailing edge of the corresponding preceding infeed object being transported along the infeed deck, such that the trailing edge of the corresponding preceding infeed object overlaps and rests on top of the infeed object.

Alternatively or additionally, the preceding infeed object continues to be conveyed by the back transporter while the trailing edge of the preceding infeed object is being raised by the actuator.

Alternatively or additionally, the actuator comprises a lapper and the lapper is configured to raise a portion of the infeed object above the plane of the infeed deck.

Alternatively or additionally, the lapper is configured to raise the trailing edge of the corresponding preceding infeed object such that movement of the infeed object towards the outfeed end of the back portion is blocked by the lapper.

Alternatively or additionally, the infeed rollcase further includes a sensor configured to detect a position of the leading edge of the infeed object being transported along the front transporter of each of the plurality of infeed decks. The circuitry determines the position of the leading edge of the infeed objects being transported based on an output of the sensor.

Alternatively or additionally, the infeed rollcase further includes an initial actuator located between the infeed end of the front portion and the outfeed end of the front portion. The circuitry is further configured to cause the initial actuator to raise or lower at least one of the leading edge of the infeed object or the trailing edge of the corresponding preceding infeed object.

Alternatively or additionally, the circuitry receives a signal indicating a time that each of the infeed objects was loaded onto the front portion and the circuitry determines the position of the leading edge of the infeed object being transported along the front transporter of each of the plurality of infeed decks based on the received signal and the drive speed of the front motor.

Alternatively or additionally, the at least one back motor comprises a single back motor that drives the back transporter of each of the plurality of infeed decks at a constant speed.

Alternatively or additionally, the infeed objects are veneer sheets.

Alternatively or additionally, the back transporter delivers the veneer sheets from the outfeed end of the back portion into a dryer.

According to another aspect, there is provided a method for controlling the transport of infeed objects being transported by an infeed rollcase comprising a plurality of infeed decks, a plurality of front motors, at least one back motor. The method includes receiving at each infeed deck a plurality of infeed objects. Each infeed object besides a first infeed object follows a corresponding preceding infeed object. Each infeed object includes a leading edge and a trailing edge. The method also includes transporting along a front portion of each infeed deck a corresponding infeed object from an infeed end of the infeed deck to an outfeed end of the infeed deck and transporting the corresponding infeed object from the front portion of each infeed deck to a back portion of the infeed deck. The method further includes determining a position of a leading edge of the infeed object being transported along the front transporter of each of the plurality of infeed decks and controlling a speed of transporting the infeed object along the front portion and along the back portion. A corresponding front motor of the plurality of front motors drives a speed of transporting along the front portion of each of the plurality of infeed decks. The at least one back motor drives a speed of transporting along the back portion of each of the plurality of infeed decks. For each of the plurality of front motors, the speed of transporting is determined based on the determined position of the leading edge of the infeed object along the corresponding front transporter, such that the infeed object being transported by each infeed deck reaches the back portion at the same time or such that the infeed object being transported by each infeed deck overlaps with the corresponding preceding infeed object being transported along a same infeed deck. The method additionally includes transporting the corresponding infeed object from an infeed end of the back portion to an outfeed end of the back portion.

Alternatively or additionally, the method also includes raising or lowering, above or below a plan of each infeed deck, a portion of the infeed object or the corresponding preceding infeed object being transported by the infeed deck. The infeed rolldeck further comprising an actuator configured to raise or lower a portion of the infeed object.

Alternatively or additionally, the portion of the infeed object raised or lowered comprises at least one of the leading edge of the infeed object or the trailing edge of the corresponding preceding infeed object.

Alternatively or additionally, for each of the plurality of front motors, the actuator and the drive speed of the front motor are controlled such that the leading edge of the infeed object located on the front portion passes under or over with the trailing edge of the corresponding preceding infeed object located on the back portion.

Alternatively or additionally, for each infeed deck, the trailing edge of the corresponding preceding infeed object being transported along the infeed deck is raised and the drive speed of the first motor is controlled such that the leading edge of the infeed object is located beneath the trailing edge of the corresponding preceding infeed object.

Also, for each infeed deck, the trailing edge of the corresponding preceding infeed object being transported along the infeed deck is lowered, such that the trailing edge of the corresponding preceding infeed object overlaps and rests on top of the infeed object.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

DETAILED DESCRIPTION

Figure 1A:
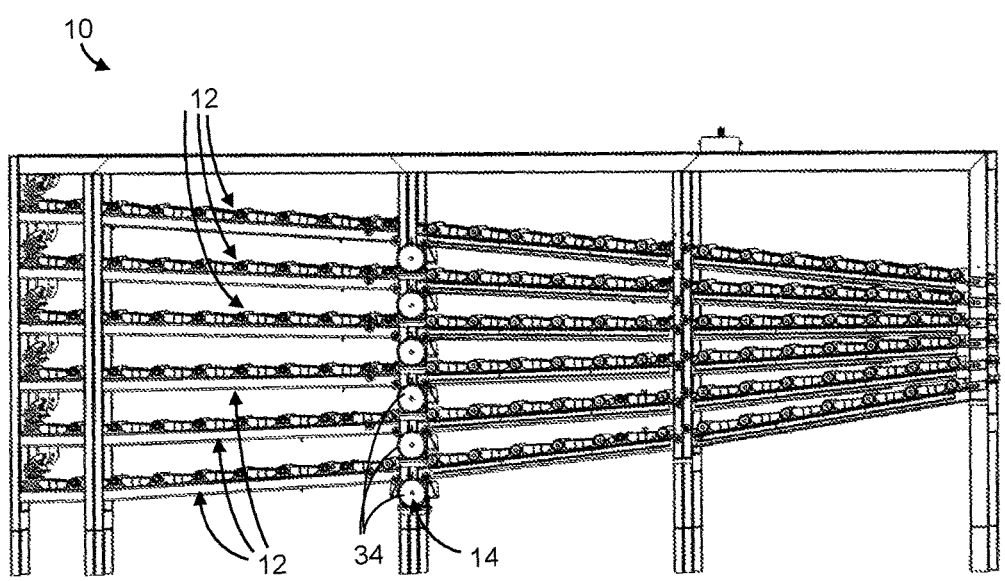
FIG. 1A is a perspective view of one side of an infeed rollcase.
Figure 1B:
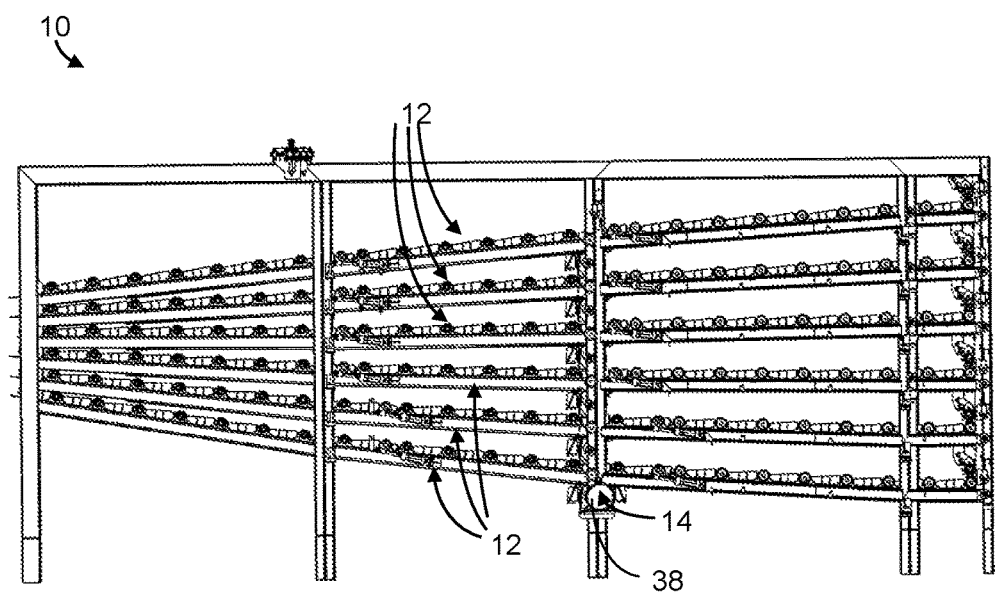
FIG. 1B is a side perspective view of the opposite side of the infeed rollcase of FIG. 1A.
Figure 1C:
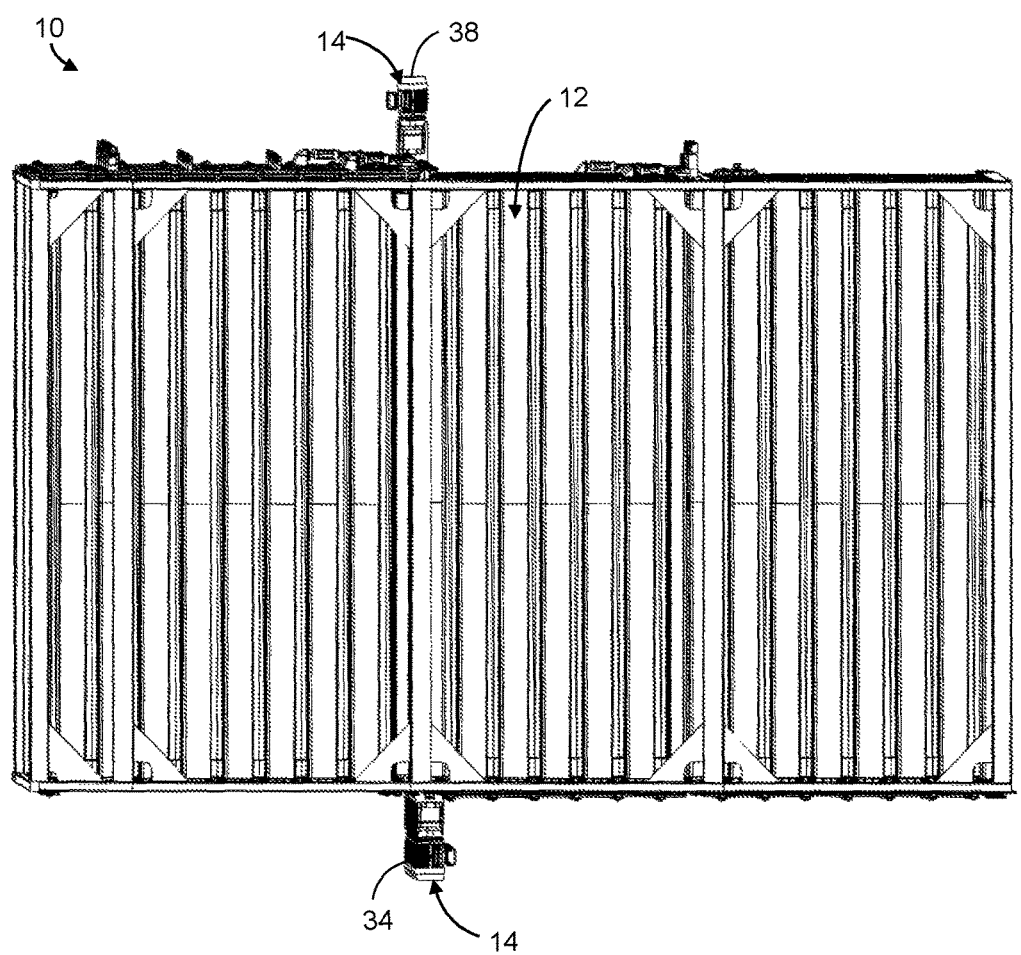
FIG. 1C is a perspective view of the top of the infeed rollcase of FIGS. 1A and 1B.

Provided is an infeed rollcase for transporting an infeed object. The rollcase uses a split drive system to move infeed objects at varying speeds in different infeed decks of the infeed rollcase. By determining the position of each infeed object along a front portion of each infeed deck, the drive speed of the split drive system is varied such that the infeed objects maintain a predetermined position (e.g., overlapping) with respect to a preceding infeed object.

Turning to FIGS. 1A-1C, 2, and 3, an infeed rollcase 10 is shown. The infeed rollcase 10 includes a plurality of infeed decks 12, a split drive system 14, and circuitry 16. Each infeed deck 12 includes a front transporter 32 driven by a front motor 34 and a back transporter 36 driven by a back motor 38. Each infeed deck transports a plurality of infeed objects 20 using the front transporter 32 and the back transporter 36. The circuitry 16 determines a position of a leading edge 40 of the infeed object 20 being transported along the front transporter 32 of each of the plurality of infeed decks 12. The circuitry 16 also controls the drive speed of each of the front motors 34 such that the infeed object 20 being transported by each infeed deck 12 reaches the back portion 36 at the same time or such that the infeed object being transported by each infeed deck 12 overlaps with the corresponding preceding infeed object 22 being transported along the same infeed deck 12.

Each infeed object 20 includes a leading edge 40, a trailing edge 42, an upper surface 44, and a lower surface 46. The leading edge 40 and the trailing edge 42 connect the upper surface 44 and lower surface 46. The infeed objects 20 may comprise veneer sheets. As will be understood by one of ordinary skill in the art, the infeed objects 20 may be made of wood, plastic, metal, composites thereof, or of any suitable material. For example, the length of the infeed objects 20 (as measured in a direction perpendicular to the leading edge 40 and trailing edge 42) may vary from about four feet (1.2 meters) up to about ten feet (3 meters). The infeed objects 20 may be thin (relative to its width and length) with thicknesses in the range of ¼ of an inch (6.35 mm) or less.

For a given infeed deck 12, each infeed object 20 follows a preceding infeed object 22. That is, for an infeed object 20 being transported along a given infeed deck 12, a preceding infeed object 22 is already being transported along the given infeed deck 12. For example, infeed objects 20 may be serially fed into and transported by each of the plurality of infeed decks 12. For this group of infeed objects 20, the first infeed object does not follow a preceding object and, for this reason, the first infeed object may not be considered an infeed object for purposes of describing operation of the infeed rollcase 10.

Figure 2:
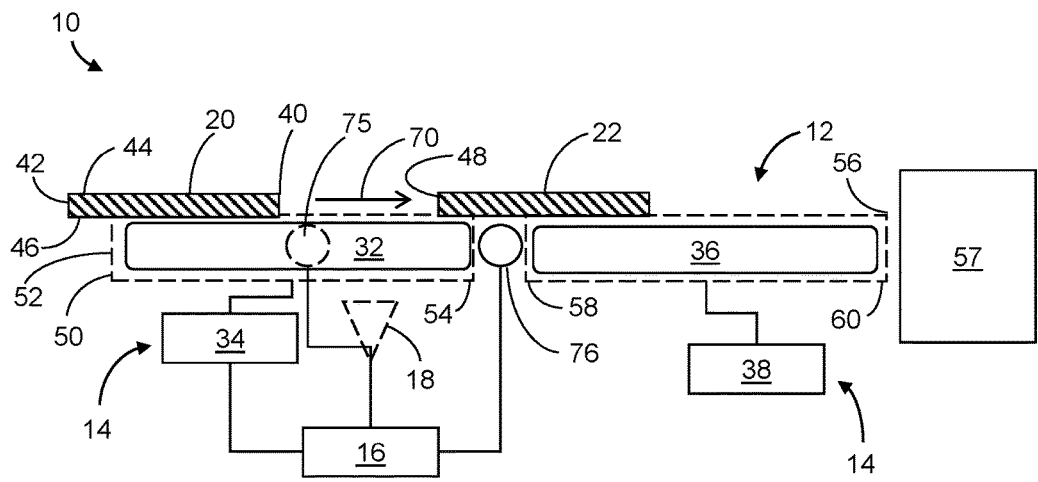
FIG. 2 is a schematic view of an infeed deck of the infeed rollcase of FIG. 1.
Figure 3:
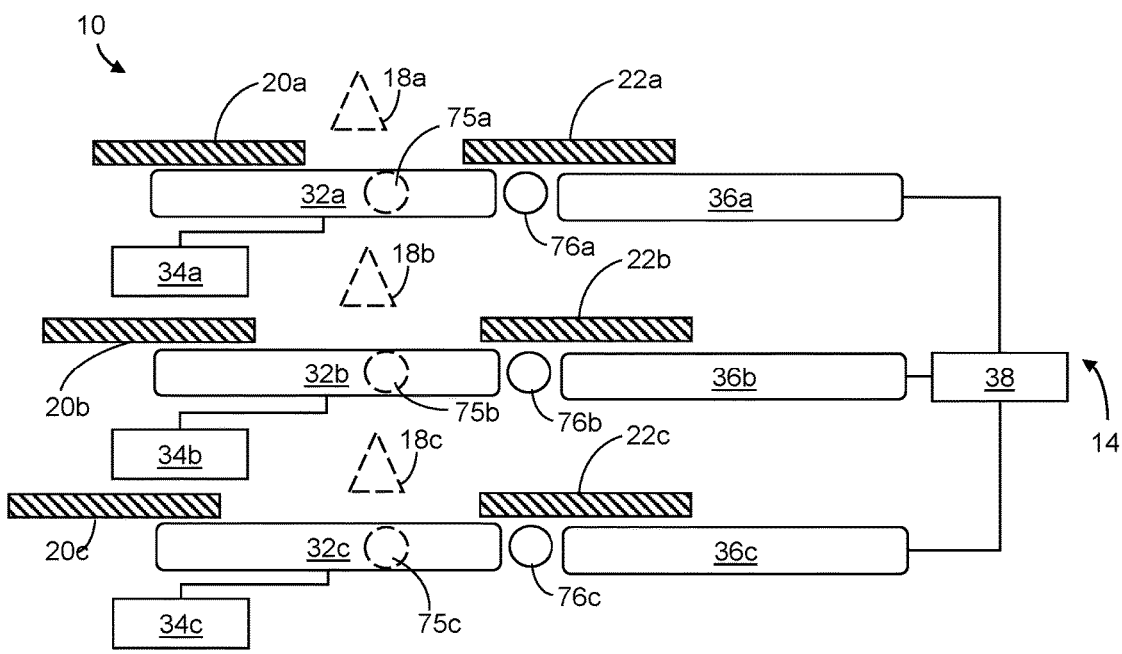
FIG. 3 is a schematic view of a plurality of infeed decks of the infeed rollcase of FIG. 1.

As described above, the infeed rollcase 10 includes a plurality of infeed decks 12. Each infeed deck 12 includes a front portion 50 having an infeed end 52 and an outfeed end 54. The front portion 50 includes the front transporter 32. Each infeed deck 12 also includes a back portion 56 having an infeed end 58 and an outfeed end 60. The back portion 56 includes the back transporter 36. A corresponding infeed object 20 being transported by an infeed deck 12 passes from the infeed end 52 of the front portion 50, to the outfeed end 54 of the front portion 50, to the infeed end 58 of the back portion 56, and to the outfeed end 60 of the back portion 56. The front portion 50 and the back portion 56 may abut one another. Alternatively, as shown in FIGS. 2 and 3, a space or object (e.g., the actuator described below) may be located between the front portion 50 and the back portion 56.

The split drive system 14 includes a plurality of front motors 34 and at least one back motor 38. Each front motor 34 of the plurality of front motors 34 drives a corresponding front transporter 32 of a corresponding one of the plurality of infeed decks 12. The at least one back motor 38 drives the back transporter 36 of each of the plurality of infeed decks 12. The at least one back motor 38 may comprise a single back motor 38 that drives the back transporter 36 of each of the plurality of infeed decks 12 at a constant speed. The front motor 34 and at least one back motor 38 may comprise any suitable motor or device configured to drive the transporters 32, 36 in order to move the infeed object 20 along the direction of travel 70.

Each front transporter 32 and/or back transporter 36 may include a conveyor, belt, rollers, or any other suitable structure for transporting the infeed objects 20. The transporters 32, 36 may comprise a continuous surface or series of surfaces for carrying the infeed objects 20 in the direction of travel 70 and defining a path of travel for the infeed objects 20. Each transporter 32, 36 may be supported on pulleys and/or retainers and may be driven by a front motor 34 or a back motor 38. The back motor 38 may drive multiple back transporters 36 via a common drive shaft.

The infeed rollcase 10 may also include a sensor 18. The circuitry 16 may determine a position of a leading edge 40 of the infeed object 20 being transported along the front transporter 32 of each of the plurality of infeed decks 12 based on the output of the sensor 18. For example, the sensor 18 may detect the position of the leading edge 40 by identifying a location of the leading edge along the infeed deck 12 and output this information to the circuitry 16. For example, the sensor 18 may comprise a computer vision system including a camera and the sensor 18 may visually identify the leading edge 40 of the infeed object 20. Alternatively, the sensor 18 may locate the position of another portion of the infeed object 20. For example, a fiducial or visual identifier may be attached to a known location on the upper surface 44 of the infeed object 20. When the sensor 18 detects a position of an element of the infeed object 20 that is not the leading edge 40, the circuitry 16 may determine the position of the leading edge 40 based on a known relationship between the detected portion of the infeed object 20 and the leading edge 40. For example, the sensor 18 may detect the position of a trailing edge 42 of the infeed object 20 or a marking on the infeed object 40.

The sensor 18 may comprise a camera, switch, laser-camera combination, RFID receiver, or any other suitable device for detecting the presence of an object. The sensor 18 may comprise a single device or multiple devices. For example, the sensor 18 may comprise a physical switch located on each infeed deck 12. The physical switch may be depressed as the infeed object 20 passes over the sensor 18, thereby identifying a location of the leading edge 40 at a specific point in time. In this example, the circuitry 16 may determine the position of the leading edge 40 of the infeed object based on the time that the sensor 18 was depressed by the infeed object 20 and the drive speed of the front motor 34. Alternatively, the sensor 18 may comprise a single camera that captures the location of each infeed object 20 located along the front transporter 32 of each of the plurality of infeed decks 12.

As described above, the infeed rollcase 10 also includes circuitry 16. The circuitry 16 is configured to determine the position of the leading edge 40 of the infeed objects 20 along the front transporter 32 of each of the plurality of infeed decks 12. The circuitry 16 may determine the position of the leading edge 40 of the infeed objects 20 along the front transporter based on an output of the sensor 18 (as described above) or by using an initial actuator 75.

The circuitry 16 may determine the position of the leading edge 40 of the infeed objects 20 along the front transporter by using an initial actuator 75 located within the front portion 50. That is, the initial actuator 75 may be positioned before a later actuator 76 located between the front portion 50 and the back portion 56. The initial actuator 75 may be configured to block movement of the infeed objects 22 on the front transporter 32 past the initial actuator 75 along the direction of travel 70. For example, the initial actuator 75 may be positioned to block movement when an infeed object 22 is loaded onto the front portion 50. This way, when the infeed object 22 reaches the position of the initial actuator 75, movement of the infeed object 22 along the direction of travel 70 is blocked. Based on the time that the infeed object 22 was loaded onto the front portion 50 and the drive speed of the front motor 34, the time at which the infeed object 22 reaches the initial actuator 75 can be determined. For example, the circuitry 16 may receive a signal indicating a time that the infeed object 22 was loaded onto the front portion 32 of the infeed deck 12. Based on the received signal and the drive speed of the front motor 34 during a duration of time since the infeed object 22 was loaded onto the front portion 32, the position of the position of the leading edge 40 of the infeed objects 20 may be determined. For example, as will be understood by one of ordinary skill in the art, the circuitry 16 may perform a mathematical integration of the drive speed of the front motor 34 during the duration of time since the infeed object 22 was loaded onto the front portion 32 to determine the distance traveled by the infeed object 20. Based on the distance traveled by the infeed object 20 and the position of the leading edge 40 of the infeed object 22 when loaded onto the front portion 32 may be used to determine the position of the leading edge 40. The circuitry 16 may receive the signal from a device loading the infeed objects 22 onto the infeed deck 12 or using a sensor 18.

As will be understood by one of ordinary skill in the art, the time that the infeed object 22 is loaded onto the front portion 50 may be determined based on a signal received from a device loading the infeed objects 22 onto the infeed rollcase 10, based on a sensor (not shown) that detects loading of the infeed object 22 onto the front portion 50 (e.g., a weight sensor or physical switch), or using any other suitable means.

For each of the plurality of front motors 34, the circuitry 16 is configured to control a drive speed of the front motor 34 based on the determined position of the leading edge 40 of the infeed object 20 along the corresponding front transporter 32. The drive speed of the front motor 34 is controlled, such that the infeed object 20 being transported by each infeed deck 12 reaches the back portion 56 at the same time or such that the infeed object 20 being transported by each infeed deck 12 overlaps with the corresponding preceding infeed object 22 being transported along a same infeed deck 12. The phrase "at the same time" does not require that the infeed object 20 of each infeed deck 12 reach the back portion 56 at the exact same instant in time. Rather, at the same time" refers to the infeed object 20 of each infeed deck 12 reaching the back portion 56 within a short window of time (e.g., a difference of less than 0.5 seconds, 1 second, 2.5 seconds, 5 seconds, or any other suitable duration of time).

As an example, FIG. 3 shows three infeed objects 20 located at different locations along the front portion 52. The circuitry 16 may maintain the drive speed of the front motor 34a connected to the top infeed deck 12, increase the drive speed of the front motor 34b connected to the middle infeed deck 12, and increase by a larger amount the drive speed of the front motor 34c connected to the bottom infeed deck 12. Alternatively, the circuitry 16 may decrease the drive speed of the front motor 34a connected to the top infeed deck 12, maintain the drive speed of the front motor 34b connect to the middle infeed deck 12, and increase the drive speed of the front motor 34c connected to the bottom infeed deck 12.

The circuitry 16 may determine the drive speed for the front motor 34 of each infeed deck 12 based on the determined position of the leading edge 40 of the infeed objects 20 relative to the position of a trailing edge 48 of the preceding infeed object 22. For example, the circuitry 16 may adjust the drive speed of each front motor 34 such that the infeed object 20 and the preceding infeed object 22 overlap by a given amount. The amount of overlap may be 0.5 inches, 1 inch, 2 inches, 3 inches, 6 inches, 12 inches, or any suitable amount. The amount of overlap may also be adjusted by a user.

As will be understood by one of ordinary skill in the art, the circuitry 16 may have various implementations. For example, the circuitry 16 may include any suitable device, such as a controller, processor, central processing unit, programmable circuit, integrated circuit, memory and I/O circuits, an application specific integrated circuit, microcontroller, complex programmable logic device, other programmable circuits, or the like. The circuitry 16 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the processor. The circuitry 16 may be communicatively coupled to computer readable medium through a system bus, mother board, or using any other suitable structure known in the art.

Each infeed deck 12 may also include a later actuator 76. The later actuator 76 The later actuator 76 may be located between the infeed end 52 of the front portion 50 and the outfeed 60 end of the back portion 56. The later actuator 76 may be configured to raise or lower, above or below a plane of the infeed deck 12 (e.g., the surface that the infeed objects 20 are supported by), a portion of the infeed object 20 or the corresponding preceding infeed object 22 being transported by the infeed deck 12. That is, the later actuator 76 may be configured to raise or lower the infeed object 20 or preceding infeed object 22, such that the infeed object 20 and the preceding infeed object 22 may overlap depending on the drive speed of the front motor 34 and back motor 38.

As an example, the later actuator 76 may be located between the outfeed end 54 of the front portion 50 and the infeed end 58 of the back portion 56. Either or both of the initial actuator 75 and the later actuator 76 may comprise a lapper configured to raise a portion of the infeed object 20 above the plane of the infeed deck 12. The lapper may be configured to raise the trailing edge 48 of the corresponding preceding infeed object 22 such that movement of the infeed object 20 along the direction of travel 70 towards the outfeed end 60 of the back portion 56 is blocked by the lapper.

Neither the initial actuator 75 nor the later actuator 76 is limited to a lapper, but may comprise any suitable device for raising or lowering the infeed object 20 or the preceding infeed object 22. For example, the later actuator 76 may cause the front portion 50 or the back portion 56 to raise, lower, or tilt. One or both of the actuators 75, 76 may comprise a push rod, a tilting platform, a vacuum source, or any other device suitable to raise or lower a portion of the infeed object 20 or preceding infeed object 22.

The circuitry 16 may be configured to control operation of both of the actuators 75, 76 (when present). That is, the circuitry 16 may be configured to cause either or both of the actuators 75, 76 to raise or lower at least one of the leading edge 40 of the infeed object 20 or the trailing edge 48 of the corresponding preceding infeed object 22. For each of the plurality of front motors 34, the circuitry 16 may also be configured to control at least one of the actuators 75, 76 and the drive speed of the front motor 34, such that the leading edge 40 of the infeed object 20 located on the front portion 50 passes under or over with the trailing edge 48 of the corresponding preceding infeed object 22 located on the back portion 56.

As an example, when there is no delay of feeding of the infeed objects 22 onto each infeed deck 12, for each infeed deck 12, the circuitry 16 may be configured to cause the initial actuator 75 of the infeed deck 12 to raise the trailing edge 48 of the corresponding preceding infeed object 22 being transported along the infeed deck 12. As described above, the actuator 75 raising the trailing edge 48 of the corresponding preceding infeed object 22 may block movement of the infeed object 22 along the direction of travel 70.

In this example when there is a delay of feeding of an infeed object 22, the initial actuator 75 may not raise the preceding infeed object 22 or block movement of the infeed object 22. Instead, for each infeed deck 12, the circuitry 16 may be configured to cause the later actuator 76 of the infeed deck 12 to raise the trailing edge 48 of the corresponding preceding infeed object 22 being transported along the infeed deck 12. The circuitry 16 may control the drive speed of the first motor 34 such that the leading edge 40 of the infeed object 20 is located beneath the trailing edge 48 of the corresponding preceding infeed object 22. The circuitry 16 may also cause the later actuator 76 of the infeed deck 12 to lower the trailing edge 48 of the corresponding preceding infeed object 22 being transported along the infeed deck 12, such that the trailing edge 48 of the corresponding preceding infeed object 22 overlaps and rests on top of the infeed object 20. The preceding infeed object 22 may continue to be conveyed by the back transporter 36 while the trailing edge 48 of the preceding infeed object 22 is being raised by the later actuator 76.

The back transporter 36 may deliver the infeed objects 20 from the outfeed end 60 of the back portion 56 into a dryer 57.

As described above, the infeed objects 20 may be delivered onto the front transporter 32. the infeed objects 20 may be pulled onto the front portion 50 by the front transporter 32. For example, each infeed deck 12 may include a vacuum opening adjacent the front transporter 32 that is in communication with a vacuum source to draw infeed objects to the front transporter 32 by suction applied to the upper surface 44 or the lower surface 46 of the infeed objects 20.

Figure 4:
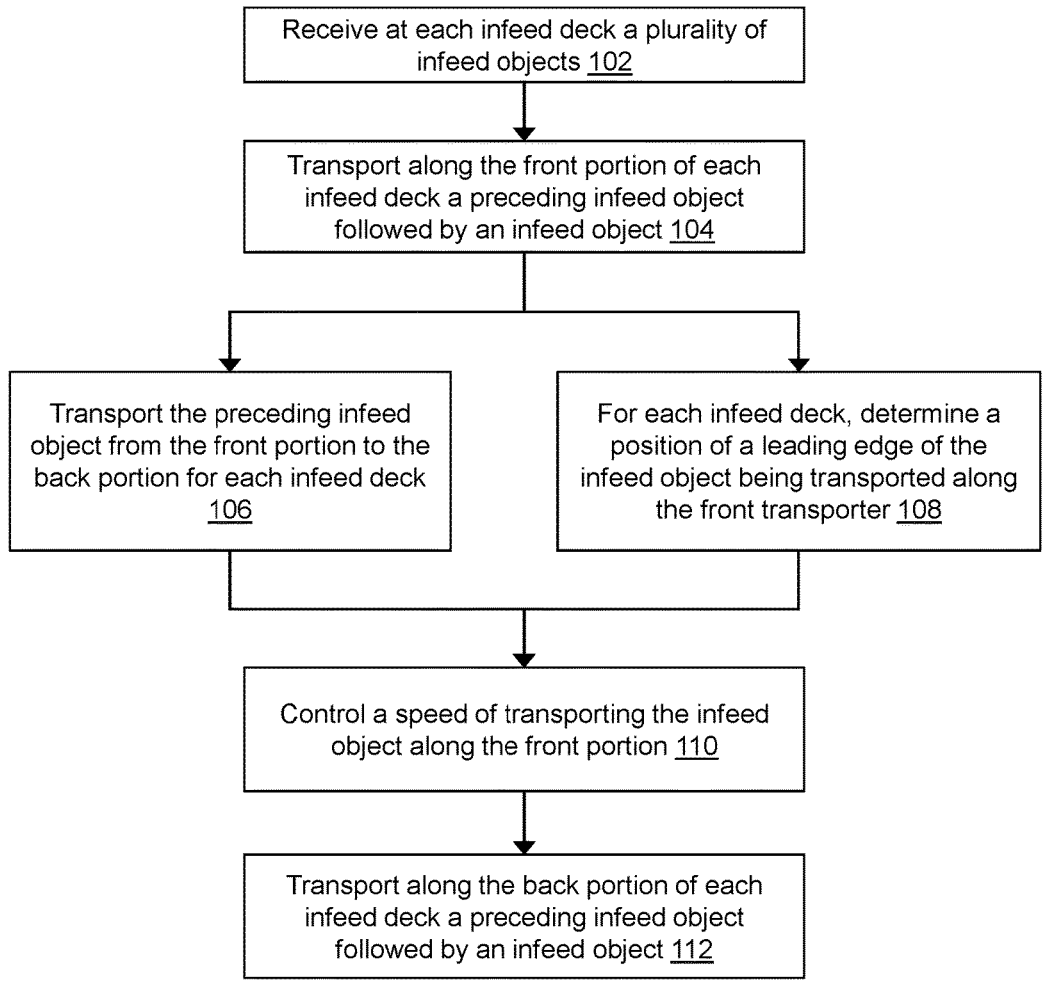
FIG. 4 is a method for controlling the transport of infeed objects by the infeed rollcase.

Turning to FIG. 4, a method 100 for controlling the transport of infeed objects 20 being transported by an infeed rollcase 10 is described.

In process block 102, a plurality of infeed objects 20 are received at each infeed deck 12. In process block 104, a corresponding infeed object 20 is transported along a front portion 50 of each infeed deck 12 from an infeed end 52 of the infeed deck 12 to an outfeed end 60 of the infeed deck 12. In process block 106, the corresponding infeed object 20 is transported from the front portion 50 of each infeed deck 12 to a back portion 56 of the infeed deck 12. As will be understood by one of ordinary skill in the art, in each infeed deck 12, the corresponding infeed object 20 may not be entirely located on the back portion 56 in process block 106. Instead, a portion of the corresponding infeed object 20 may remain on the front portion 50. For example, the portion of the corresponding infeed object 20 remaining on the front portion 50 may be raised by the later actuator 76 such that the corresponding infeed object 20 is no longer being transported by the front transporter 32. That is, the corresponding infeed object 20 may be transported solely by the back transporter 36.

In process block 108, a position of a leading edge 40 of the infeed object 20 being transported along the front transporter 32 of each of the plurality of infeed decks 12 is determined. In process block 110, a speed of transporting the infeed object 22 along the front portion 50 is controlled. For each of the plurality of front motors 34, the speed of transporting is determined based on the determined position of the leading edge 40 of the infeed object 22 along the corresponding front transporter 32, such that the infeed object 22 being transported by each infeed deck 12 reaches the back portion 56 at the same time or such that the infeed object 22 being transported by each infeed deck 12 overlaps with the corresponding preceding infeed object 20 being transported along a same infeed deck 12.

In process block 112, the corresponding infeed object 20 is transported from an infeed end 58 of the back portion 56 to an outfeed end 60 of the back portion 56.

All ranges and ratio limits disclosed in the specification and claims may be combined in any manner. Unless specifically stated otherwise, references to "a," "an," and/or "the" may include one or more than one, and that reference to an item in the singular may also include the item in the plural.

The phrase "and/or" means "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" has the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, means at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are open-ended, i.e., meaning including but not limited to.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An infeed rollcase comprising:
a plurality of infeed decks each including an actuator, wherein each of the plurality of infeed decks is configured to transport a plurality of infeed objects in parallel with other infeed decks of the plurality of infeed decks, wherein:
    each infeed object follows a corresponding preceding infeed object;
    each infeed object includes a leading edge and a trailing edge; and
    each infeed deck includes:
        a front portion having an infeed end and an outfeed end and including a front transporter; and
        a back portion having an infeed end and an outfeed end and including a back transporter, wherein a corresponding infeed object transported by the infeed deck passes from the infeed end of the front portion, to the outfeed end of the front portion, to the infeed end of the back portion, and to the outfeed end of the back portion; and
a split drive system including:
    a plurality of front motors, wherein each front motor drives a corresponding front transporter of a corresponding one of the plurality of infeed decks;
    at least one back motor, wherein the at least one back motor drives the back transporter of each of the plurality of infeed decks; and
    circuitry configured to:
        determine the position of a leading edge of the infeed objects being transported along the front transporter of each of the plurality of infeed decks; and
        be operable to control a drive speed of each of the front motors based on the determined position of the leading edge of the infeed object along the corresponding front transporter, selectively such that either:
            the infeed object being transported by each infeed deck reaches the back portion at the same time; or
            the infeed object being transported by each infeed deck overlaps with the corresponding preceding infeed object being transported along a same infeed deck.

2. The infeed rollcase of claim 1, wherein the actuator of each infeed deck is located between the infeed end of the front portion and the outfeed end of the back portion; and
    wherein the actuator is configured to raise or lower, above or below a plane of the infeed deck, a portion of the infeed object or the corresponding preceding infeed object being transported by the infeed deck.

3. The infeed rollcase of claim 2, wherein the actuator is located between the outfeed end of the front portion and the infeed portion of the back portion.

4. The infeed rollcase of claim 2, wherein the circuitry is further configured to cause the actuator to raise or lower at least one of the leading edge of the infeed object or the trailing edge of the corresponding preceding infeed object.

5. The infeed rollcase of claim 4, wherein for each of the plurality of front motors, the circuitry is further configured to control the actuator and the drive speed of the front motor, such that the leading edge of the infeed object located on the front portion passes under or over with the trailing edge of the corresponding preceding infeed object located on the back portion.

6. The infeed rollcase of claim 5, wherein, for each infeed deck, the circuitry is configured to:
    cause the actuator of the infeed deck to raise the trailing edge of the corresponding preceding infeed object being transported along the infeed deck;
    control the drive speed of the first motor such that the leading edge of the infeed object is located beneath the trailing edge of the corresponding preceding infeed object; and
    cause the actuator of the infeed deck to lower the trailing edge of the corresponding preceding infeed object being transported along the infeed deck, such that the trailing edge of the corresponding preceding infeed object overlaps and rests on top of the infeed object.

7. The infeed rollcase of claim 6, wherein the preceding infeed object continues to be conveyed by the back transporter while the trailing edge of the preceding infeed object is being raised by the actuator.

8. The infeed rollcase of claim 2, wherein the actuator comprises a lapper and the lapper is configured to raise a portion of the infeed object above the plane of the infeed deck.

9. The infeed rollcase of claim 8, wherein the lapper is configured to raise the trailing edge of the corresponding preceding infeed object such that movement of the infeed object towards the outfeed end of the back portion is blocked by the lapper.

10. The infeed rollcase of claim 2, further comprising a sensor configured to detect a position of the leading edge of the infeed object being transported along the front transporter of each of the plurality of infeed decks, wherein the circuitry determines the position of the leading edge of the infeed objects being transported based on an output of the sensor.

11. The infeed rollcase of claim 2, further comprising an initial actuator located between the infeed end of the front portion and the outfeed end of the front portion, wherein the circuitry is further configured to cause the initial actuator to raise or lower at least one of the leading edge of the infeed object or the trailing edge of the corresponding preceding infeed object.

12. The infeed rollcase of claim 2, wherein the circuitry receives a signal indicating a time that each of the infeed objects was loaded onto the front portion and the circuitry determines the position of the leading edge of the infeed object being transported along the front transporter of each of the plurality of infeed decks based on the received signal and the drive speed of the front motor.

13. The infeed rollcase of claim 1, wherein the at least one back motor comprises a single back motor that drives the back transporter of each of the plurality of infeed decks at a constant speed.

14. The infeed rollcase of claim 1, wherein the infeed objects are veneer sheets.

15. A transport system comprising:
a dryer; and
the infeed rollcase of claim 1, wherein the back transporter delivers the veneer sheets from the outfeed end of the back portion into the dryer.

16. A method for controlling the transport of infeed objects being transported by an infeed rollcase, the method comprising:
providing the infeed rollcase comprising a plurality of infeed decks each including an actuator, a plurality of front motors, and at least one back motor, wherein each of the plurality of infeed decks is configured to transport a plurality of infeed objects in parallel with other infeed decks of the plurality of infeed decks;

receiving at each infeed deck the plurality of infeed objects, wherein:
- each infeed object besides a first infeed object follows a corresponding preceding infeed object; and
- each infeed object includes a leading edge and a trailing edge;

transporting along a front portion of each infeed deck a corresponding infeed object from an infeed end of the infeed deck to an outfeed end of the infeed deck;

transporting the corresponding infeed object from the front portion of each infeed deck to a back portion of the infeed deck;

determining a position of a leading edge of the infeed object being transported along the front transporter of each of the plurality of infeed decks; and controlling a speed of transporting the infeed object along the front portion and along the back portion, wherein:
- a corresponding front motor of the plurality of front motors drives a speed of transporting along the front portion of each of the plurality of infeed decks;
- the at least one back motor drives a speed of transporting along the back portion of each of the plurality of infeed decks; and
- for each of the plurality of front motors, the speed of transporting is determined based on the determined position of the leading edge of the infeed object along the corresponding front transporter, selectively such that;

the infeed object being transported by each infeed deck reaches the back portion at the same time; or the infeed object being transported by each infeed deck overlaps with the corresponding preceding infeed object being transported along a same infeed deck; and transporting the corresponding infeed object from an infeed end of the back portion to an outfeed end of the back portion.

17. The method of claim 16, further comprising raising or lowering, above or below a plan of each infeed deck, a portion of the infeed object or the corresponding preceding infeed object being transported by the infeed deck,
wherein the actuator is configured to raise or lower a portion of the infeed object.

18. The method of claim 17, wherein the portion of the infeed object raised or lowered comprises at least one of the leading edge of the infeed object or the trailing edge of the corresponding preceding infeed object.

19. The method of claim 18, wherein for each of the plurality of front motors, the actuator and the drive speed of the front motor are controlled such that the leading edge of the infeed object located on the front portion passes under or over with the trailing edge of the corresponding preceding infeed object located on the back portion.

20. The method of claim 19, wherein, for each infeed deck:
- the trailing edge of the corresponding preceding infeed object being transported along the infeed deck is raised;
- the drive speed of the first motor is controlled such that the leading edge of the infeed object is located beneath the trailing edge of the corresponding preceding infeed object; and
- the trailing edge of the corresponding preceding infeed object being transported along the infeed deck is lowered, such that the trailing edge of the corresponding preceding infeed object overlaps and rests on top of the infeed object.

21. The infeed rollcase of claim 1, wherein the circuitry is operable to control the drive speed of each of the front motor based on the determined position of the leading edge of the infeed object along the corresponding front transporter, such that the infeed object being transported by each infeed deck reaches the back portion at the same time.

22. The infeed rollcase of claim 1, wherein the circuitry is operable to control the drive speed of each of the front motor based on the determined position of the leading edge of the infeed object along the corresponding front transporter, such that the infeed object being transported by each infeed deck overlaps with the corresponding preceding infeed object being transported along the same infeed deck.

* * * * *